US010131117B2

(12) United States Patent
Thirion et al.

(10) Patent No.: US 10,131,117 B2
(45) Date of Patent: Nov. 20, 2018

(54) FABRICATION PROCESS OF COATED STAMPED PARTS

(75) Inventors: Isabelle Thirion, Hagondange (FR); Thomas Vietoris, Berlin (DE); Raisa Grigorieva, Metz (FR); Pascal Drillet, Rozerieulles (FR); Ludwig Schaller, Reichertshofen (DE); Karl Michael Bader, Ingolstadt (DE); Uwe Paar, Kassel (DE); Michael Alsmann, Baunatal (DE)

(73) Assignee: ARCELORMITTAL INVESTIGACION Y DESARROLLO, S.L., Bizkaia (ES)

( * ) Notice: Subject to any disclaimer, the term of this patent is extended or adjusted under 35 U.S.C. 154(b) by 771 days.

(21) Appl. No.: 13/147,178

(22) PCT Filed: Feb. 1, 2010

(86) PCT No.: PCT/EP2010/000586
§ 371 (c)(1),
(2), (4) Date: Dec. 16, 2011

(87) PCT Pub. No.: WO2010/086186
PCT Pub. Date: Aug. 5, 2010

(65) Prior Publication Data
US 2012/0085467 A1 Apr. 12, 2012

(30) Foreign Application Priority Data

Feb. 2, 2009 (WO) .................. PCT/EP2009/000670

(51) Int. Cl.
| | |
|---|---|
| *C21D 1/40* | (2006.01) |
| *B32B 15/01* | (2006.01) |
| *C21D 1/42* | (2006.01) |
| *C21D 1/673* | (2006.01) |
| *C21D 1/68* | (2006.01) |
| *C21D 1/70* | (2006.01) |
| *C21D 7/13* | (2006.01) |
| *C22C 21/00* | (2006.01) |

(Continued)

(52) U.S. Cl.
CPC .............. *B32B 15/012* (2013.01); *C21D 1/40* (2013.01); *C21D 1/42* (2013.01); *C21D 1/673* (2013.01); *C21D 1/68* (2013.01); *C21D 1/70* (2013.01); *C21D 7/13* (2013.01); *C22C 21/00* (2013.01); *C22C 21/02* (2013.01); *C22C 38/02* (2013.01); *C22C 38/04* (2013.01); *C22C 38/18* (2013.01); *C22C 38/32* (2013.01); *C23C 10/28* (2013.01); *C21D 1/08* (2013.01); *C21D 1/09* (2013.01); *C21D 2211/002* (2013.01); *C21D 2211/008* (2013.01); *Y02P 10/253* (2015.11)

(58) Field of Classification Search
CPC . C21D 1/40; C21D 1/42; C21D 1/673; C21D 1/68; C21D 1/70; C22C 21/00; C22C 21/02

USPC .................. 148/525, 526, 400, 531
See application file for complete search history.

(56) References Cited

U.S. PATENT DOCUMENTS

2011/0129381 A1* 6/2011 Hasegawa et al. ............. 420/83

FOREIGN PATENT DOCUMENTS

| JP | 09202953 A | 8/1997 |
| JP | 2004244704 A | 9/2004 |

(Continued)

OTHER PUBLICATIONS

Machine translation of JP 2007314874, 2007.*
International Search Report for PCT/EP2010/000586, dated Apr. 5, 2010.
International Search Report for PCT/EP2009/000670, dated Oct. 13, 2009.

*Primary Examiner* — Edward M Johnson
(74) *Attorney, Agent, or Firm* — Schwabe, Williamson & Wyatt, P.C.

(57) ABSTRACT

A manufacturing process of a hot stamped coated part comprising the following successive steps, in this order: providing a hot rolled or cold rolled steel sheet comprising a steel substrate and an aluminium-silicon alloy precoating, the precoating containing more than 50% of free aluminium and having a thickness comprised between 15 and 50 micrometers, then cutting the steel sheet to obtain a precoated steel blank, then heating the blank under non protective atmosphere up to a temperature $T_i$ comprised between $T_e-10°$ C. and $T_e$, Te being the eutectic or solidus temperature of the precoating, then heating the blank from the temperature $T_i$ up to a temperature $T_m$ comprised between 840 and 950° C. under non protective atmosphere with a heating rate V comprised between 30° C./s and 90° C./s, V being the heating rate between the temperature $T_i$ and the temperature $T_m$, in order to obtain a coated heated blank, then soaking the coated heated blank at said temperature $T_m$ for a time $t_m$ comprised between 20 s and 90 s, then hot stamping the blank in order to obtain a hot stamped coated part, then cooling said stamped part at a cooling rate in order to form a microstructure in the steel substrate comprising at least one constituent chosen among martensite or bainite.

11 Claims, 3 Drawing Sheets

(51) Int. Cl.
*C22C 21/02* (2006.01)
*C22C 38/02* (2006.01)
*C22C 38/04* (2006.01)
*C22C 38/18* (2006.01)
*C22C 38/32* (2006.01)
*C23C 10/28* (2006.01)
*C21D 1/08* (2006.01)
*C21D 1/09* (2006.01)

(56) References Cited

FOREIGN PATENT DOCUMENTS

| | | | | |
|---|---|---|---|---|
| JP | 2007314874 A | 12/2007 | | |
| WO | WO 2006022053 A1 * | 3/2006 | ............. | C22C 38/00 |
| WO | 2007064172 A1 | 6/2007 | | |

* cited by examiner

20μm

20μm

20μm

FABRICATION PROCESS OF COATED STAMPED PARTS

CROSS REFERENCE TO RELATED APPLICATION

The present application is a national phase entry application under 35 U.S.C. § 371 of International Application No. PCT/EP2010/000586, filed Feb. 1, 2010, entitled "Fabrication Process of Coated Stamped Parts and Parts Prepared From the Same," which designates the United States of America, and which claims priority to International Application No. PCT/EP2009/000670, filed Feb. 2, 2009, entitled "Fabrication Process of Coated Stamped Parts and Parts Prepared From the Same," and which also designates the United States of America, the entire content and disclosures of which are hereby incorporated by reference in their entireties.

The present invention pertains to a method for fabricating hot stamped parts prepared from steel sheet precoated with aluminium-silicon alloy, and to hot stamped coated products obtained by this method.

The use of a hot-stamping process of precoated sheets for the manufacturing of parts has become widespread especially in the automotive industry since it allows to produce parts with high mechanical resistance and good resistance to shocks. The metallic precoating avoids oxidizing and decarburizing of the steel substrate during furnace heating before hot stamping. By interdiffusion between the precoating and the steel substrate, an intermetallic alloy with high melting temperature is formed in the coating. Heating temperature is chosen so as to austenitize the steel, thus further hardening of the steel substrate by quenching in the forming tools is also obtained.

European Patent Specification EP0971044 discloses a hot stamping process with steel sheets precoated with a coating on the basis of aluminium or aluminium alloy: the parts obtained after hot stamping offer high resistance to corrosion, to wear and fatigue, and are suitable for ulterior painting.

International Publication WO2008053273 discloses a hot stamping process wherein the heating and austenitizing steps in the furnace are chosen so as to obtain a succession of four distinctive layers in the coating of the stamped part: the heating rate for a temperature rise between 20 and 700° C. is comprised between 4 and 12° C./s. This makes it possible to obtain improved spot weldability with this particular configuration of layers.

The pre-coated steel blanks are travelling on rollers in furnaces during heating before the hot stamping step. According to International Publication WO2008053273, the heating conditions of Al-precoated blanks are also chosen so as to avoid melting in the coating, which could lead to fouling of the rollers in the furnaces. As a consequence of fouling, the production line has sometimes to be temporarily stopped for maintenance, which reduces productivity.

Furthermore, the duration for heating and soaking of the blanks can be in the order of a few minutes. As a consequence, the length of the furnaces where blanks are travelling can be quite important, which is a concern from an industrial point of view. Thus, there is an important need to shorten the length of the heating lines.

Attempts have been performed to increase the productivity of the process by shortening the soaking duration at the austenitizing temperature: however, this approach has found its limits since a sufficient time is necessary for the interdiffusion of steel substrate elements, in particular iron, with the aluminium based coating. Furthermore, reduction of the heating time is also a problem since melting of the coating is experienced for the very rapid heating rates, thus leading to a smooth surface of the coating and poor adhesion of painting on the stamped part.

Thus, starting from Al based precoated steel sheets, there remains a need for a manufacturing process making it possible to prepare stamped parts or products with high mechanical resistance, and which offers superior ability to ulterior painting.

There remains also a need for a process which makes it possible to obtain parts whose coating is very adherent to the substrate at fabrication or service temperatures, and offers superior resistance to spalling and corrosion.

There remains also a need for a process with enhanced productivity, which makes it possible to avoid rollers fouling.

It is an object of the present invention to solve the above mentioned problems and to provide a novel process for producing hot stamped parts prepared from an aluminium-silicon pre-coated steel sheet.

It is another object of the present invention to provide a process for fabrication of hot stamped parts which can be used in a motor vehicle.

It is another object of the present invention to provide novel methods of making stamped parts whose coatings combine high adherence to the steel substrate, ability for painting and resistance to spalling.

It is another object of the invention to provide a part with a novel coating after hot stamping, which combines high ability for painting and resistance to spalling and corrosion.

Thus, an object of this invention is a manufacturing process of a hot stamped coated part comprising the following successive steps, in this order:

providing a hot rolled or cold rolled steel sheet comprising a steel substrate and an aluminium-silicon alloy precoating, the precoating containing more than 50% of free aluminium and having a thickness comprised between 15 and 50 micrometers, then cutting the steel sheet to obtain a precoated steel blank, then heating the blank under a non protective atmosphere up to a temperature $T_i$ comprised between $T_e-10°$ C. and $T_e$, Te being the eutectic or solidus temperature of the precoating, then heating the blank from the temperature $T_i$ up to a temperature $T_m$ comprised between 840 and 950° C. under a non protective atmosphere at a heating rate V comprised between 30° C./s and 90° C./s, V being the heating rate between the temperature $T_i$ and the temperature $T_m$, in order to obtain a coated heated blank, then soaking the coated heated blank at said temperature $T_m$ for a time $t_m$ comprised between 20 s and 90 s, then hot stamping the blank in order to obtain a hot stamped coated part, then cooling said stamped part at a cooling rate in order to form a microstructure in the steel substrate comprising at least one constituent chosen among martensite or bainite.

According to a preferred embodiment, the heating rate V between the temperatures $T_i$ and $T_m$ is comprised between 50 and 80° C./s.

According to a preferred embodiment, the precoating comprises, by weight, 5-11% Si, 2-4% Fe, optionally between 15 and 30ppm Ca, optionally between 50 and 700 ppm Sr, the remainder being aluminium and impurities inherent in processing, the temperature $T_i$ is comprised between 567 and 577° C. and the temperature $T_m$ is comprised between 855 and 950° C.

Another object of the invention is a manufacturing process of a hot stamped coated part, comprising the following successive steps, in this order:

providing a hot rolled or cold rolled steel sheet comprising a steel substrate and an aluminium-silicon alloy precoating, said precoating containing more than 50% of free aluminium and having a thickness comprised between 15 and 50 micrometers, then cutting the steel sheet to obtain a precoated steel blank, then heating the steel blank under non-protective atmosphere at a heating rate V up to a temperature $T_m$, in order to fully transform the steel substrate microstructure into austenite and to obtain, immediately after heating and prior to ulterior soaking, between 10 and 60% of liquid phase on the surface of the precoating, then, transforming the liquid phase of precoating at the temperature $T_m$ during a soaking period $t_m$ in order to obtain a coated heated blank with coating having between 0 and 30% of liquid phase on its surface at the end of said soaking period, and comprising by weight between 20 and 50% Fe on its surface, then hot stamping the blank in order to obtain a hot stamped part, then cooling the stamped part in order to form a microstructure in said steel substrate comprising at least one constituent chosen among martensite or bainite.

Preferentially, the heating is performed at least partly by induction heating. According to a preferential mode, the heating is performed at least partly by resistance heating.

Preferentially, the heating is performed at least partly by infrared heating. According to a preferential mode, the heating is performed at least partly by gas burners.

In a particular mode, the heating is performed by any combination of the heating processes above.

Preferentially, the total thickness of the coating is comprised between 20 and 60 micrometers.

The object of the invention is also a hot stamped coated part comprising a steel substrate having a microstructure comprising at least one constituent chosen among bainite or martensite, and a coating on each one of the two sides of said substrate, the coating being composed of the following layers, containing Si in solid solution, starting from the layer contiguous to said steel substrate:

a $Fe_3Al$ layer a FeAl, or $\tau_1$ or $\tau_2$ layer atop of the $Fe_3Al$ layer an external layer composed of more than 70% of $FeAl_3$ or $Fe_2Al_5$, said $FeAl_3$ or $Fe_2Al_5$ layer containing a discontinuous minor phase of FeAl, or $\tau_1$ or $\tau_2$, atop of said FeAl or $\tau_1$ or $\tau_2$ layer, said external layer having more than 70% of crystals on its surface.

Preferentially FeAl, or $\tau_1$ or $\tau_2$ layer atop of said $Fe_3Al$ layer, has less than 13% Si in solid solution, and $FeAl_3$ or $Fe_2Al_5$ in said external layer has less than 6% Si in solid solution, and said discontinuous minor phase of FeAl, or $\tau_1$ or $\tau_2$, has less than 13% Si in solid solution.

Preferentially, the sum of the thicknesses of said layer $Fe_3Al$ and said FeAl, or $\tau_1$ or $\tau_2$ layer, is less than one third of the total thickness of said coating.

In a preferential mode, the thickness of the coating on each one of said sides in comprised between 20 and 60 micrometers.

Other advantages and characteristics will appear in the description and exemplary embodiments below, in reference to the joint figures.

Figure 1:
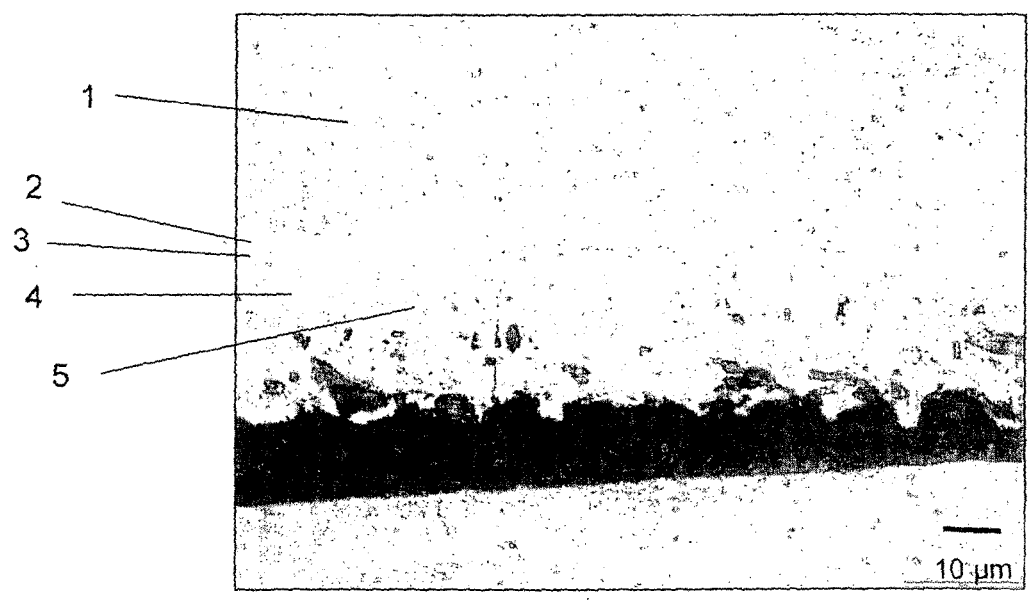
FIG. 1 shows a cross section view of a structure of the coating of a hot stamped part according to the invention.

The invention is implemented with precoated steel strips which comprise a strip, or substrate, of base steel and a precoating of aluminium-silicon alloy on both sides of the strip of the base steel.

The term "precoating" refers to the layer of aluminium-silicon alloy deposited on the substrate which has not been heated, just before the step of hot stamping. As will be explained below, the heating cycle of Al—Si precoated sheet before hot forming and further soaking at high temperature cause a change in the nature and the morphology of the precoating, resulting from phase transformations and interdiffusion with the steel substrate. These transformations and interdiffusion mechanisms give rise to the formation of an optimum coating on the surface of the hot stamped parts.

Precoatings with aluminium-silicon alloy may be obtained by continuous hot dip aluminizing through immersion of the steel sheet in a liquid bath of type I Aluminium, or Al—Si, containing, by weight, 5-11% Si, 2-4% Fe, possibly between 15 and 30ppm Ca and possibly between 50 and 700 ppm Strontium, the remainder being aluminium and impurities inherent in processing. Silicon prevents the formation of a thick iron-metallic intermetallic layer which reduces adherence and formability. Typical precoatings comprise, starting from the steel substrate, a very thin (usually less than 1 micrometer) interfacial layer with $FeAl_3$ and $Fe_2Al_5$, atop a layer of $\tau 5$ phase (hexagonal phase of the type $Fe_3Si_2Al_{12}$ with mass concentrations of 29-36% Fe, 6-12% Si), usually 2-7 micrometers, and atop an Al—Si matrix including islands of eutectic Al—Fe—Si (Al dendrites, S1 and $\tau 6$ (monoclinic phase of the type $Fe_2Si_2Al_9$ with 26-29% Fe and 13-16% Si in mass))

The invention is not limited to these compositions, however.

The thickness of Al—Si precoating is comprised between 15 and 50 micrometers on each side. This range is chosen so as to obtain an optimal alloying of the precoating with the steel substrate according to the particular heating kinetics of the invention which will be presented below.

The precoating according to the invention contains more than 50% of free aluminium, as related to the total aluminium in the precoating. If such a condition is not fulfilled, a high quantity of aluminium is bound as a component with high melting point in the precoating, and there is no possibility to obtain sufficient melting under the heating conditions of the invention. In other words, after hot dip aluminizing, a sufficient proportion of mainly unalloyed Al, i.e. Al not bound with Fe or Si, must be present. An intermediate alloying thermal treatment after hot dip aluminizing and before heating and hot stamping prevents the possibility of implementing the invention, because this treatment would cause the formation of intermetallics with high melting point. Thus, a further heating before hot stamping would not cause a sufficient amount of melting in the coating for implementing the invention.

Additionally, a further intermediate treatment might cause the formation of martensite in the substrate. As cutting or punching of the sheets into the blanks must be performed, martensite has to be avoided in the steel substrate to minimise wear of the cutting tools. Furthermore, when martensite-ferrite interfaces are present in the substrate microstructure, damage may be induced around the cut edges due to the different intrinsic properties of these constituents.

The steel substrate composition is not critical as long as it displays good wettability when the sheet is hot dipped in the aluminium or aluminium alloy bath. However, for certain applications requiring high mechanical strength, such as structural parts in cars, it is preferred that the steel substrate has a composition enabling the hot stamped part to obtain a high strength, for example ranging from 500 to 1600 MPa, depending on the requirements and usage conditions. When higher levels of resistance are aimed at, a steel composition comprising, by weight: 0.15%<C<0.5%, 0.5%<Mn<3%, 0.1%<silicon<0.5%, 0.01%<Cr<1%, Ni<0.1%, Cu<0.1%, Ti<0.2%, Al<0.1%, P<0.1%, S<0.05%, 0.0005%<B<0.08%, and further containing iron and impurities inherent in processing, is preferred. An example of a preferred commercially available steel for use in the strip of base steel is 22MnB5.

When a level of strength in the range of 500 MPa on the hot stamped part is desired, a steel composition comprising 0.040%≤C≤0.100%, 0.80%≤Mn≤2.00%, Si≤0.30%, S≤0.005%, P≤0.030%, 0.010%≤Al≤0.070%, 0.015%≤Nb≤0.100%, 0.030%≤Ti≤0.080%, N≤0.009%, Cu≤0.100%, Ni≤0.100%, Cr≤0.100%, Mo≤0.100%, Ca≤0.006%, and further containing iron and impurities inherent in processing, is preferred The steel strip can be fabricated from a hot-rolling mill, and optionally may be cold-rolled again depending on the final thickness desired. Thicknesses may vary, for example, in the range between 0.7 to 3 mm.

Precoated strips are thereafter cut into precoated blanks in view of the subsequent hot stamping step.

The inventors have discovered that particular heating and soaking conditions give rise to particular coating microstructure and properties. These conditions are the following:

As a first step, the blanks have to be heated under a non protective atmosphere up to an intermediate temperature $T_i$ comprised between $T_e$–10° C. and $T_e$. $T_e$ designates the solidus temperature of the precoating or, if this precoating solidifies with an eutectic mode, the eutectic temperature. The $T_e$ temperature may be obtained from Fe—Al—Si diagrams published by V. G. Rivlin, G. V. Raynor: "Phase equilibria in iron ternary alloys", Institute of Metals of Metals, 1988.

Alternatively, $T_e$ can be derived experimentally by heating the precoating alloy and determining the onset of the liquid formation. According to the invention, heating is performed up to a temperature just slightly inferior to the melting temperature of the precoating. For example, in the case of an Al—Si precoating comprising 5-11% Si and 2-4% iron, the eutectic temperature $T_e$ of the precoating is around 577° C. and corresponds to the equilibrium between liquid and (Al, Si and $\tau_6$ ($Al_9Fe_2Si_2$) phase). This first heating step is not too critical since it occurs in a low temperature range where alloying kinetics is slow, and a wide range of heating rates and heating processes may be used in this first step. This first heating step may be either performed with the same heating means than the following one, or by using separate heating means or devices.

the second step, following immediately the first one, is specially important for controlling the nature of the sequence of transformations in the pre-coating. In particular, the heating rate V between $T_i$ and an austenitizing temperature $T_m$, must be particularly controlled.

First, temperature $T_m$ has to be higher than 840° C. for enabling the full transformation of austenite of the steel substrate. This temperature of 840° C. makes it also possible for the peritectic transformation to occur and causes the disappearance of the $\tau5$ phase in the pre-coating. In the case of an Al—Si precoating (5-11% Si, 2-4% Fe), the temperature $T_m$ has to be higher than 855° C.

But the temperature $T_m$ has to be limited below 950° C. in order to prevent excessive aluminium oxide formation at the surface of the precoating, and/or unacceptable melting of the precoating. Thus, $T_m$ must be comprised between 840 and 950° C. or 855 and 950° C. for an Al—Si precoating.

Then, the heating rate V must be higher or equal to 30° C./s: if the heating rate is too slow, a too high proportion of liquid is formed at the surface of the precoating at the end of the heating step and before the ulterior soaking. Thus, drops of precoating are susceptible to flow and to foul the rollers in the furnace with this high proportion of molten precoating. Furthermore, a slow heating rate favours the formation of a final coating composed of 4 or 5 layers. This layer disposition is less favourable than the coating of the invention from the point of view of resistance to deformation since the increase of the interfaces between the different phases and the increase in hardness gradients lowers the resistance to spalling. The coating of the invention has not more than 3 layers. While not bound by a particular theory, it is believed that the reduction in the number of layers with different intrinsic properties lowers the formation of residual stresses, and thus the resistance to deformation.

If the heating rate V is higher than 90° C./s, the surface of the precoating is molten to a large extent when the temperature $T_m$ is reached. The composition is locally enriched in Si, and further transformation occurs in the form of a ternary eutectic (Al—Si—Fe) with low melting point so that the surface of the precoating remains mainly liquid during the soaking at temperature $T_m$. Thus, the surface of the coating formed at the end of this soaking, resulting from the transformation of the precoating, is mainly smooth and has a poor aptitude for ulterior painting.

When the heating rate V is comprised between 30 and 90° C./s, the precoating is molten to an adequate extent on its surface and the kinetics of transformation are accelerated to such a high extent as to enable the transformation of the liquid phase into Fe and Al based intermetallic. This high transformation kinetics also hampers the formation of a 4 or 5 layers structure in the coating. A more compact coating is produced with less stratified layers. This brings an advantage because less interfaces are produced, which would induce in turn a higher mechanical resistance due to increased homogeneity. In particular, the coating thus obtained is mainly composed of $FeAl_3$ or $Fe_2Al_5$. When the heating rate is comprised between 50 and 80° C./s, this character of compactness is more specially developed and a FeAl3 or $Fe_2Al_5$ layer is for the most part present.

Figure 6:
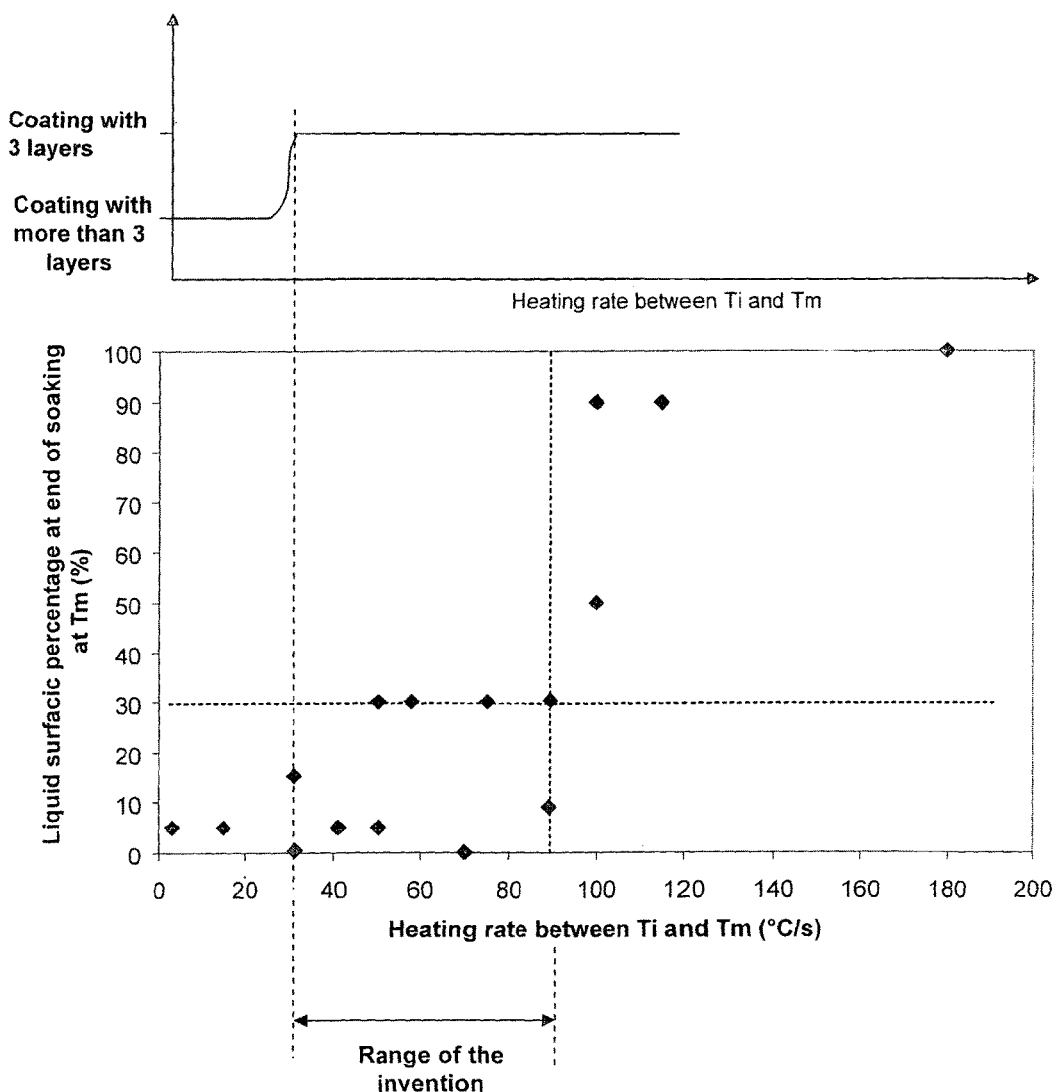
FIG. 6 shows the nature of the coating and the liquid surfacic proportion at the end of the soaking period, as a function of heating rate.

FIG. 6 indicates that the specific range of heating rate of the invention makes it possible to obtain simultaneously a proportion of liquid at the surface to lower than 30% at the end of the soaking, and a coating having not more than three layers.

Soaking is performed at temperature $T_m$ during a period of time $t_m$ comprised between 20 and 90 s. This soaking period enables the transformation of a fraction or the totality of the liquid phase at the surface of the precoating, into a coating having a majority of $FeAl_3$ or $Fe_2Al_5$ intermetallics at its surface. This soaking period enables also the full transformation of the steel substrate into austenite and the homogenisation of the austenite grain. This in turn makes it possible to obtain mechanical homogeneity on the final part. This soaking period is shorter than for usual treatments, which in turn increases productivity.

After the soaking period, the heated blank is transferred from the furnace to a hot stamping device. Hot stamping is thus performed to obtain a stamped part. Cooling may be performed either in the hot stamping tooling itself, or partly after hot stamping and transfer of the part in a special cooling device. The part is cooled with a cooling rate chosen, according to steel composition, so as to obtain martensite or bainite, or a combination of these constituents, which makes it possible to obtain parts with high mechanical resistance.

According to one form of the invention, the heating rate between $T_i$ and $T_m$ is chosen so as to obtain between 10 and 60% of liquid phase at the surface of the precoating at temperature $T_m$, before the beginning of soaking: if the surface proportion of liquid phase is higher than 60%, the risk of fouling of the rollers to occur in the furnaces becomes important. A minimal proportion of 10% is desired for being adapted to the lower thickness (15 micrometers) of the precoating in the invention. While not bound by a particular theory, it is believed that, under these particular conditions, the precoating does not melt completely in its thickness and, due to surface tension of the precoating, the drops of liquid aluminium are less susceptible to flow on the rollers, or susceptible to flow on a limited number of rollers because of much less liquid ratio to transform.

Then, soaking time at $T_m$ is chosen so as to transform isothermally this liquid phase for obtaining a heated blank with a coating having between 0 and 30% of liquid phase on its surface at the end of said soaking period, and comprising by weight between 20 and 50% Fe on its surface. The proportion of liquid on the surface is limited to 30% so as to obtain a rough surface on the final part. An iron content less than 20% on the surface of the coating indicates an insufficient number of intermetallic crystals at the surface of the coating. When the Fe content is higher than 50%, the resistance to corrosion of the stamped part tends to be reduced.

The coating obtained on the hot stamped part according to the conditions of the invention is composed of the following layers (starting from the steel substrate):
  a thin layer of $Fe_3Al$
  atop of this Fe3Al layer, a very thin layer of FeAl or $\tau_1$ ($Al_3Fe_3Si_2$ type) or $\tau_2$ ($Al_2FeSi$ type) phases, these phases being able to coexist in this layer. These phases contain Si in solid solution, with less than 13% Si by weight in solid solution.
  an external layer composed of more than 70% of $FeAl_3$ or $Fe_2Al_5$, these phases being able to coexist. These intermetallic phases contain Si in solid solution, in less than 6% Si by weight. This $FeAl_3$ or $Fe_2Al_5$ layer, which constitutes the majority of the coating, contains a minor phase under the form of discontinuous islands of FeAl, or $\tau_1$, or $\tau_2$. This minor phase contains less than 13% Si in solid solution.

Particularly good adhesion properties are observed when this external layer is the large main constituent of the coating, i.e. when the sum of the thicknesses of the $Fe_3Al$ layer and the FeAl or $\tau_1$, or $\tau_2$ layer, is less than one third of the total coating thickness. The total coating thickness on the stamped part ranges from 20 to 60 micrometers. The inventors discovered that such a layer disposal, wherein the external layer is in its majority composed of the hardest phases of the coating ($FeAl_3$ or $Fe_2Al_5$), is particularly favourable since this disposal reduces the coefficient of friction in hot stamping.

Furthermore, excellent paint adhesion is obtained when the coating displays on its surface, more than 70% of intermetallic crystals, this percentage being expressed in surfacic proportion.

EXAMPLES

Cold rolled steel sheets with thickness of 1 and 2mm, with steel composition comprising, in weight, 0.22% C, 1.2% Mn, 0.2% Si, 0.2% Cr, 0.040% Al, 0.003% B, 0.030% Ti, 0.0002% S, 0.020% P, the remainder being iron and impurities inherent in processing, were supplied. The microstructure is composed of ferrite-pearlite. At this stage, the absence of martensite enables easy further cutting, drilling or punching of the sheets.

These steel sheets have been precoated by continuous immersion of the sheet in an Al—Si liquid bath. A precoating, 27 micrometers thick, comprising by weight 9% Si, 3% Fe, the remainder being aluminium and impurities inherent in processing, is thus obtained. This precoating is composed of:
  A thin layer (less than 1 micrometer) of $FeAl_3$ and $Fe_2Al_5$, directly in contact with the steel substrate.
  Atop of this layer, a layer of intermetallic $\tau 5$ with hexagonal structure, 5 micrometers thick
  Atop of this layer, an unalloyed layer, 21 micrometers thick, with a matrix of Al—Si with composition above. Its structure is composed of Al dendrites including Si and Fe in solid solution and islands of Al—Si eutectic. This unalloyed layer occupies about 80% of the precoating thickness.

Thus, Al is mostly free in this precoating, which indicates the possibility of sufficient ulterior melting in the heat treatment. The eutectic melting temperature $T_e$ of this precoating is 577° C.

In one testing condition referenced as "B" in table 1 below, the thickness of the precoating was 15 micrometers.

The sheets were cut into blanks which were heated, hot stamped and rapidly cooled so as to obtain parts with a steel substrate fully composed of martensite.

Heating was performed under a non protective (usual) atmosphere using different techniques:
  Heating by radiation in a resistance furnace
  Heating in a furnace with gas burners
  Heating within an infrared furnace
  Induction heating
  Resistance heating, where sheets were maintained within conductive jaws and heated by Joule effect.

Heating was performed up to a temperature $T_i$ of 575° C. (i.e. $T_e - 2°$ C.), then up to a temperature $T_m$ where soaking was eventually performed. The heating rate V from temperature $T_i$ up to temperature $T_m$ was controlled.

Table 1 presents the different parameters of the tests and the results obtained.

The liquid phase percentage on the precoating surface after heating at $T_m$, and before the soaking step, was determined by examinations with a Scanning Electron Microscope (SEM) at 500× magnification, of the surfaces of specimens after interrupted quench at the temperature $T_m$ before the soaking step: areas with liquid phase which existed at temperature $T_m$ are characterized by a smooth surface and may be distinguished from crystallized phases which have a rough appearance (emerging single crystals).

The liquid phase proportion after soaking was determined on the hot stamped and cooled part with similar SEM observations of the coating surfaces, and quantification: the coatings may present a variable surfacic fraction of liquid at the end of the soaking step, the remaining fraction is constituted of crystallised intermetallic phases. A high percentage of crystals emerging at the surface indicates good adhesion of further painting treatments (cataphoresis) This is also characterized by the criterion of smooth or uneven surface (low or high aptitude to painting). The iron content was measured on the surface of the coating of the hot stamped and cooled part, using the technique of X-ray diffraction with low incidence angle. The iron content of the liquid phase on the surface of the coating at the end of the soaking step is identical to the iron content of the coating, after the ulterior hot stamping and cooling steps.

the surfacic proportion which can be measured from image analysis on a cross-section microstructure of the coating. Intermetallic $FeAl_3$ contains 3% by weight Si in solid solution. FeAl (indicated by 5), in the form of discontinuous islands, contains 9% Si in solid solution. Similar microstructures are also observed in the other tests corresponding to the conditions of invention.

Figure 3:
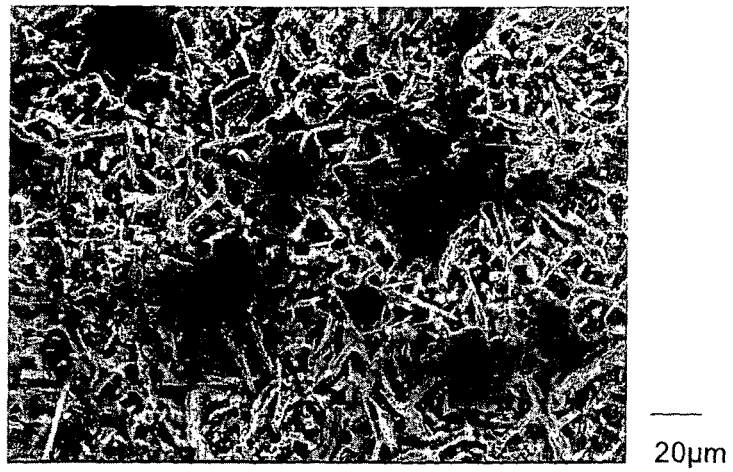
FIG. 3 shows a top view of a surface of a coating manufactured according to the invention

SEM observations (FIG. 3) indicate a surface fully covered by crystals, mainly $FeAl_3$.

Figure 2:
FIG. 2 shows a cross section view of a layered structure of the coating of a hot stamped part obtained by a process non corresponding to the invention.

For a heating rate of 3° C./s (test A) or 15° C./s (test B) the coating structure is composed of 5 layers, as illustrated in FIG. 2: starting from the substrate (indicated by 6) the coating is composed of $Fe_3Al$ layer (indicated by 7), FeAl (8), $FeAl_3$ (9), FeAl (10) and $FeAl_3$ (11) layers. Even if this layer disposition offers good weldability, its compactness is inferior to the one of the invention. It is also to mention that the main constituent of the external layer (i.e. $FeAl_3$) is similar in FIG. 1 and FIG. 2, which indicates also the stability of the welding range in the conditions of invention. However, the conditions of the invention make it possible to obtain a compact layer, specially marked for test conditions D, E, G, H, I.

Under the conditions of the invention, more than 70% of crystals are present on the surface of the coating, together

TABLE 1

Testing conditions and results obtained.

| Test n° | Nature [1] | Heating process [2] | Heating rate V (° C./s) | $T_m$ (° C.) | $t_m$ (s) | Liquid phase on surface before soaking (%) [3] | Liquid phase on surface after soaking [4] | Iron content in the liquid phase [5] | Smooth (S) or uneven (U) surface | 3 Layers with $FeAl_3$ or $Fe_2Al_5$ at the surface [6] |
|---|---|---|---|---|---|---|---|---|---|---|
| A | R | RF | 3 | 900 | 180 | 100 | 5 | 45 | U | No |
| B | R | FB | 15 | 900 | 0 | 5 | 5 | 43 | U | No |
| C | I | IR | 41 | 900 | 60 | 35 | 5 | 45 | U | Yes |
| D | I | R | 50 | 900 | 60 | 50 | 30 | 25 | U | Yes |
| E | I | R | 50 | 900 | 60 | 30 | 5 | 45 | U | Yes |
| F | R | FB | 55 | 1200 | 0 | 70 | 70 | 71 | S | Yes |
| G | I | IN | 58 | 900 | 60 | 40 | 30 | 50 | U | Yes |
| H | I | R | 70 | 900 | 60 | 30 | 0 | 45 | U | Yes |
| I | I | IN | 75 | 900 | 60 | 40 | 30 | 50 | U | Yes |
| J | R | IN | 100 | 900 | 60 | 50 | 50 | >50 | S | Yes |
| K | R | IN | 100 | 1000 | 60 | n.d. | 70 | 71 | S | n.d. |
| L | R | R | 100 | 900 | 60 | 100 | 90 | >50 | S | Yes |
| M | R | IN | 115 | 975 | 60 | n.d. | 90 | >50 | S | n.d. |
| N | R | IN | 180 | 900 | 60 | 100 | 100 | >50 | S | Yes |
| O | I | IR | 30 | 900 | 90 | 30 | 0 | 43 | U | Yes |
| P | I | IR | 90 | 900 | 20 | 50 | 30 | 30 | U | Yes |
| Q | I | FB | 90 | 900 | 90 | 60 | 10 | 44 | U | Yes |
| R | R | IR | 30 | 900 | 20 | 30 | 15 | 37 | U | Yes |

Underlined values indicate conditions outside of the invention.
n.d: not determined.
[1] Nature: I = corresponding to the invention R = Reference.
[2] Heating process for heating from $T_i$ (575° C.) to $T_m$. FB = Furnace with burners heating. IF = Infrared heating. IN = Induction heating. R = Resistance heating (Joule effect) RF: Furnace heated by resistance.
[3] Liquid phase proportion on the surface of the precoating after heating at $T_m$ and before the soaking step.
[4] Liquid phase proportion on the surface of the coating after soaking at $T_m$.
[5] Iron content (% by weight) on the surface of the coating.
[6] Characterizes a coating having a three-layer structure with $FeAl_3$ or $Fe_2Al_5$ crystals on its surface.

Tests C to E, G to I, and O to R correspond to the conditions of the invention. FIG. 1 illustrates an example of coating according to test condition H, corresponding to the invention: starting from the steel substrate (indicated by 1 on the FIG. 1), the coating is composed of a 5 micrometers $Fe_3Al$ layer to (indicated as 2), a very thin (less than 1 micrometer) FeAl layer (indicated by 3) with 7% Si by weight in solid solution, and an external layer of 25 micrometers (indicated by 4) constituting more than 80% of the total thickness of the coating. This external layer is composed of 80% of $FeAl_3$ and 20% of FeAl. These percentages refer to with an iron content comprised between 20 and 50% on the surface of the external layer. This indicates a good aptitude for ulterior painting.

Test B has been performed with a too low heating rate and soaking time $t_m$, on a precoating of insufficient thickness. As a consequence, the liquid phase proportion at the end of the heating step is insufficient and the nature of the final coating is not corresponding to the invention.

Test F has been performed with a too high temperature $T_m$ and a too short soaking time: thus, the percentage of liquid before and after soaking is excessive. Furthermore, aluminium oxide has formed due to too high temperature. Its presence at the surface of the coating lowers weldability.

Figure 5:

Tests J to N have been heated at too high heating rates, from 100 to 180° C./s. FIG. 5 illustrates the surface obtained in the test N, where the coating is fully covered of liquid after soaking at $T_m$. This coating displays very low adherence for ulterior cataphoresis.

Figure 4:
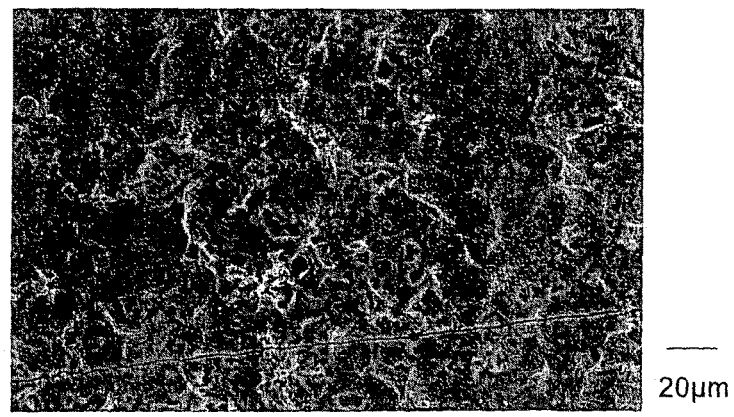
FIGS. 4 and 5 illustrate top views of surfaces of coatings manufactured in conditions not corresponding to the invention

FIG. 4 illustrates the surface obtained in test L: Even if crystals are more present than in this case, adherence for painting is still insufficient. Thus, the particular conditions of the invention lead to a favourable combination of layer disposition and a low surfacic proportion of liquid at the end of the soaking period, as indicated in FIG. 6. This in turn leads to good resistance to corrosion and wear, high mechanical resistance and weldability. Furthermore, the productivity of the manufacturing process is significantly increased, since both the heating phases and the soaking times are reduced, which allows to design more compact hot stamping lines. Taking advantage of their characteristics, the hot stamped parts manufactured according to the invention will be used with profit in the automobile industry.

The invention claimed is:

1. A manufacturing process of a hot stamped coated part comprising the following successive steps, in this order:
   providing a hot rolled or cold rolled steel sheet comprising a steel substrate and an aluminium-silicon alloy precoating, said precoating containing more than 50% of free aluminium and having a thickness selected to enable alloying with said steel substrate, then
   cutting said steel sheet to obtain a precoated steel blank, then
   heating said blank under a non protective atmosphere up to a temperature $T_i$, near the melting temperature of said precoating, then
   heating said blank from said temperature $T_i$, up to an austenitization temperature $T_m$ of said steel substrate, under a non-protective atmosphere at a heating rate V between 30° C./s and 90° C./s, V being the heating rate between said temperature $T_i$, and said temperature $T_m$, in order to obtain a coated heated blank, with a surface of precoating having a percentage of a liquid phase between 10 and 60%, wherein the temperature $T_i$, is between $T_e$-10° C. and $T_e$, where $T_e$ is the eutectic or solidus temperature of the precoating, wherein Te is about 577° C., then
   soaking said coated heated blank at said temperature $T_m$ for a time $t_m$ between 20 s and 90 s, to bring the percentage of the liquid phase of the surface of precoating to lower than 30% at the end of the soaking, then
   hot stamping said blank in order to obtain a hot stamped coated part, then cooling said stamped part at a cooling rate in order to form a microstructure in said steel substrate comprising at least one constituent chosen among martensite or bainite.

2. The manufacturing process of claim 1, wherein said heating rate V between said temperatures $T_i$, and $T_m$ is between 50 and 80° C./s.

3. The manufacturing process of claim 1, wherein said precoating is comprising, by weight, 5-11% Si, 2-4% Fe, optionally between 15 and 30 ppm Ca, between 50 and 700 ppm Sr, the remainder being aluminium and impurities inherent in processing, said temperature $T_i$ is between 567 and 577° C., and said temperature $T_m$ is between 855 and 950° C.

4. The process of claim 1, wherein said heating is performed at least partly by induction heating.

5. The process of claim 1, wherein said heating is performed at least partly by resistance heating.

6. The process of claim 1, wherein said heating is performed at least partly by infrared heating.

7. The process of claim 1, wherein said heating is performed at least partly by gas burners.

8. The process of claim 1, wherein said heating is performed by any combination of induction heating, resistance heating, infrared heating, or gas burners.

9. The process of claim 1, wherein the total thickness of said coating is between 20 and 60 micrometers.

10. The manufacturing process of claim 1, wherein the thickness of the precoating is between 15 and 50 micrometers.

11. The manufacturing process of claim 1, wherein the temperature $T_m$ is between 840 and 950° C.

* * * * *